United States Patent [19]

Killian

[11] Patent Number: 5,222,141

[45] Date of Patent: Jun. 22, 1993

[54] APPARATUS AND METHOD FOR ENCODING DATA

[75] Inventor: Maverick M. Killian, Ft. Worth, Tex.

[73] Assignee: Motorola, Inc., Schaumburg, Ill.

[21] Appl. No.: 856,616

[22] Filed: Mar. 25, 1992

[51] Int. Cl.⁵ .............................................. H04L 9/02
[52] U.S. Cl. ........................................ 380/42; 380/28; 380/45; 380/49
[58] Field of Search .................. 380/28, 42, 44, 45, 380/47, 49, 50; 371/37.7

[56] References Cited

U.S. PATENT DOCUMENTS

| | | | |
|---|---|---|---|
| 4,771,429 | 9/1988 | Davies et al. | 380/46 X |
| 4,903,299 | 2/1990 | Lee et al. | 380/49 X |
| 4,944,006 | 7/1990 | Citta et al. | 380/42 X |
| 5,070,528 | 12/1991 | Hawe et al. | 380/48 |
| 5,146,497 | 9/1992 | Bright | 380/49 X |

*Primary Examiner*—Tod R. Swann
*Attorney, Agent, or Firm*—Raymond J. Warren

[57] ABSTRACT

A first bit of the communication signal is encrypted and forwarded to a CRC where it is processed in parallel with the encryption of the second bit. The first bit is then passed to the scrambler and the second bit is passed to the CRC where they are processed in parallel with a third bit which is encrypted. This process continues until the last bit is scrambled.

6 Claims, 4 Drawing Sheets

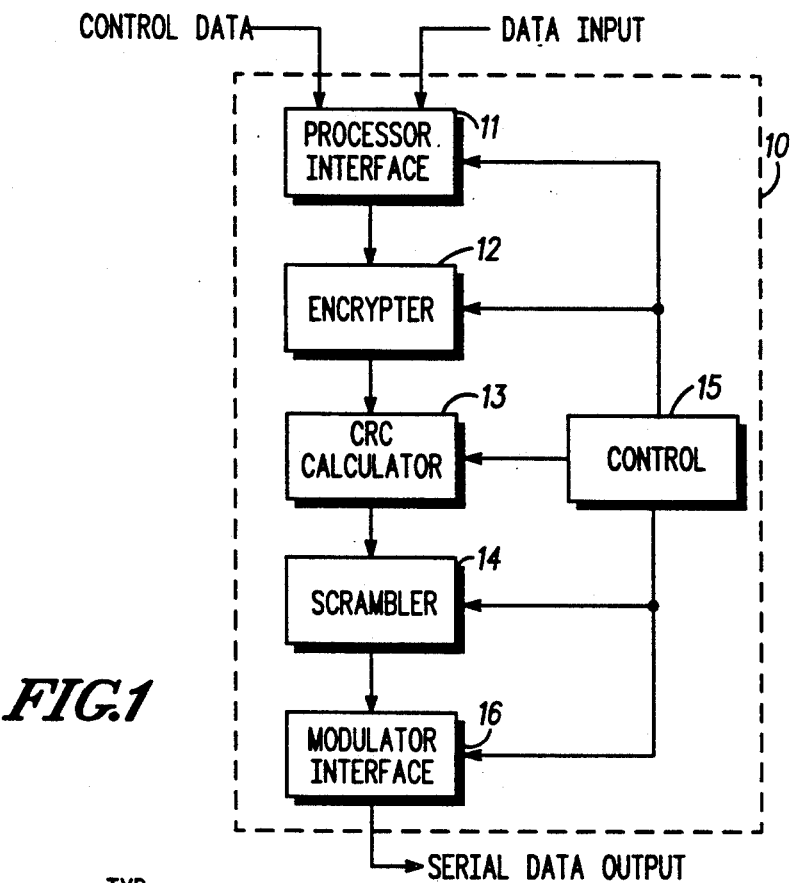
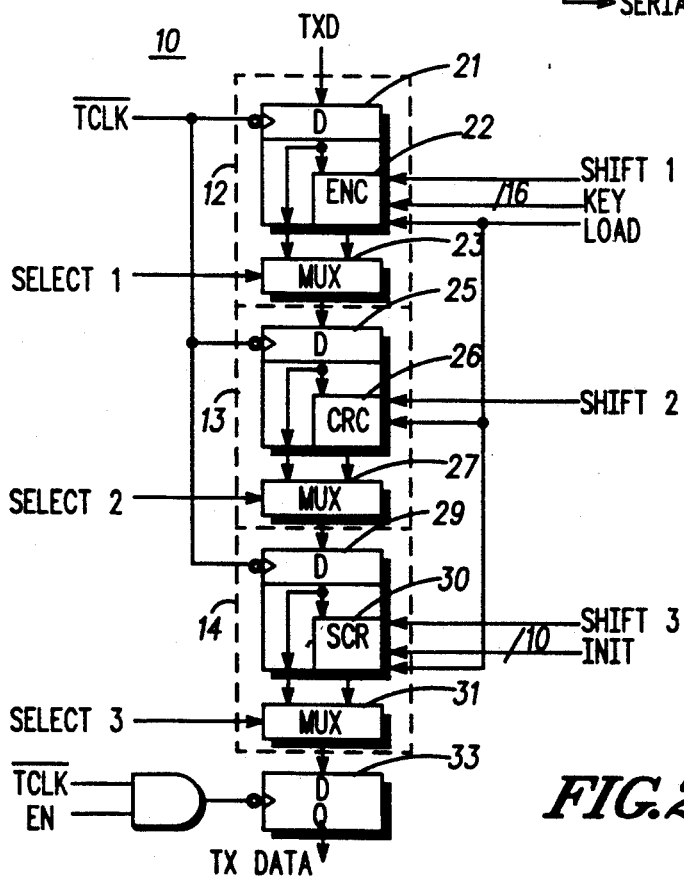

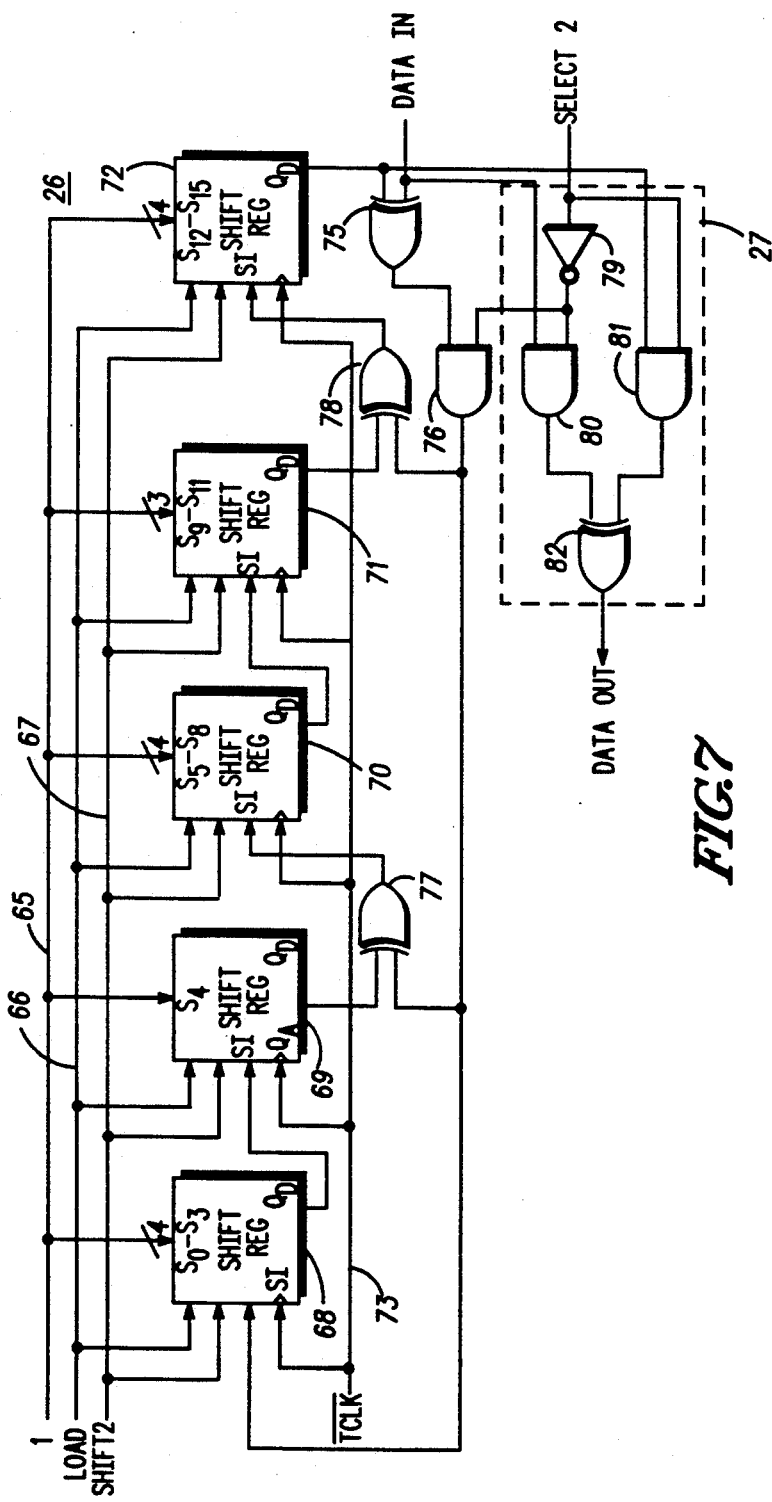
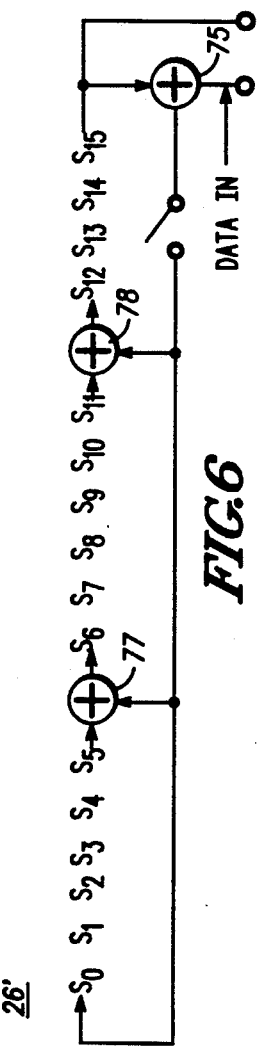
FIG.7
FIG.6

APPARATUS AND METHOD FOR ENCODING DATA

FIELD OF THE INVENTION

The present invention relates, in general, to communication systems and, more particularly, to an apparatus and method for encoding data for transmission by a communication system.

BACKGROUND OF THE INVENTION

As used in the present invention, the term encoding consists of one or more of the following functions: encrypting, cyclic redundancy checking (CRC) generation, and scrambling. The present methods of performing these functions require that an entire block of data be completely processed through the encrypting process before it is passed on to the next function. The entire data block would then be run through a CRC generator to generate the CRC code which is inserted into the block. Once the CRC code is inserted, the block is scrambled and transmitted.

Because the block of data is entirely processed by each function before being forwarded to the next function, there is a requirement for multiple buffers (preprocessing and post processing buffers). In addition, since each function waits to process the entire block before passing the block on, there is a great deal of delay built into the system.

SUMMARY OF THE INVENTION

The present invention provides a method of encrypting, cyclically redundancy checking, and scrambling a communication signal in a serial bit, or pipelined, fashion. In operation, a first bit of the communication signal is encrypted. The first bit is then passed to the CRC where it is processed in parallel with the encryption of the second bit. The first bit is then passed to the scrambler and the second bit is passed to the CRC where they are processed in parallel with a third bit which is being encrypted. This process continues until the last bit is scrambled.

BRIEF DESCRIPTION OF THE DRAWINGS

FIG. 1 is a general block diagram of an encoder embodying the present invention;

FIG. 2 is a more detailed block diagram of the encoder of FIG. 1;

FIG. 6 is a processing diagram of a cyclic redundancy checker utilized in the present invention;

FIG. 7 is a block diagram of a cyclic redundancy checker utilized in the present invention;

DETAILED DESCRIPTION OF THE DRAWINGS

Figure 3:
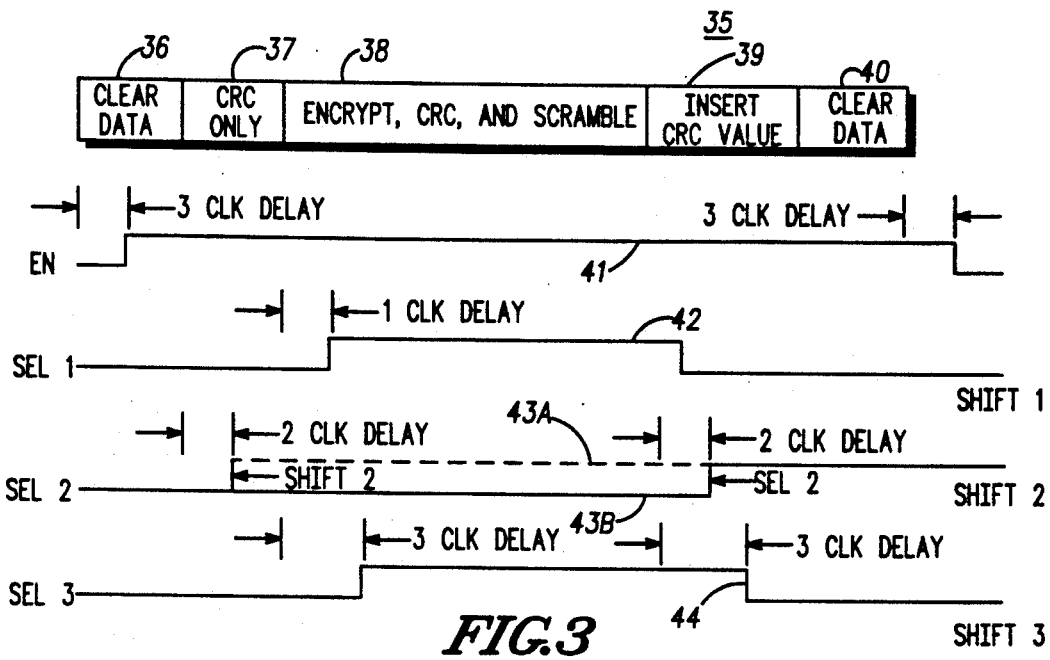
FIG. 3 is a timing diagram of the encoder of FIG. 2.

Referring initially to FIG. 1, a general block diagram of an encoder, generally designated 10, embodying the present invention is illustrated. Encoder 10 consists of an encrypting device 12, CRC calculator 13, and scrambler 14 serially coupled together. Data is received by encoder 10 from at a processor interface 11. Processor interface 11 receives data and control inputs from other system circuitry, not shown. The data is processed in a pipeline fashion through the various functions; and the control information is passed to a control circuit 15. Control circuit 15 operates to, inter alia: shift data, load encryption keys, reset the CRC, select output connections, etc. After the processing of each bit is completed, the bits are passed to a modulator interface 16 for transmission.

In FIG. 2, a more detailed block diagram of encoder 10 is illustrated. The data input TXD is input to a D-type flip-flop 21 of encrypting device 12. Flip-flop 21 is triggered by a $\overline{TCLK}$ input to the clock input of flip-flop 21. As the bits are clocked through flip-flop 21, they are provided to the encrypting circuit 22 and directly to a first input of a MUX 23. The output of encoder circuit 22 is provided at a second input of MUX 23. Since not all of the bits in a block of data will be encrypted, SELECT 1 is provided to select which bit is permitted to pass to the next stage, the original bit or the encrypted bit.

Figure 4:
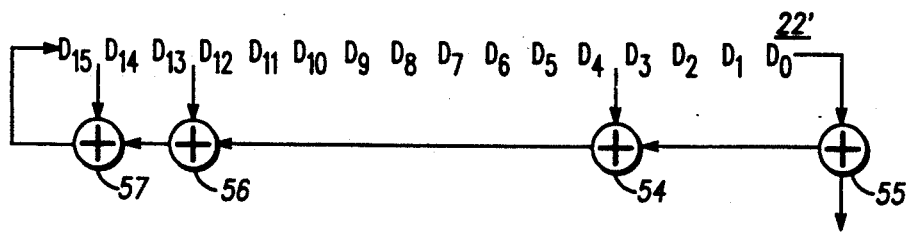
FIG. 4 is a processing diagram of an encoder utilized in the present invention.

Encrypting circuit 22 also receives a SHIFT 1 input for shifting the encryption key, this will be described in more detail with respect to FIG. 4 below. A KEY input is provided to input the original key word to encrypting device 22 which is loaded when the LOAD signal directs.

The bits output from encrypting device 12 are then input to an another D-type flip-flop 25. Flip-flop 25 is also clocked by the $\overline{TCLK}$ signal being provided to the clock input of flip-flop 25. The bits are processed through CRC circuit and provided directly to a first input of a MUX 27. The output from CRC 26 is coupled to a second input of MUX 27. A SELECT 2 signal is provided to MUX 27 to select which of the two inputs is passed to scrambling stage 14. CRC 13 also has a SHIFT 2 input used to shift the CRC data as bits are processed. The LOAD input is used to reset CRC 13 since it always starts at a preset value.

The bits output from CRC stage 13 are input to a third D-type flip-flop 29 of scrambler 14 which is also clocked by the $\overline{TCLK}$ signal. The output of flip-flop 29 is provided to scrambler circuit 30 and to a first input of a MUX 31. The output from scrambler circuit 30 is provided to the second input of MUX 31. A SELECT 3 signal is provided to the control input of MUX 31 to select the input to be passed out of scrambler stage 14 to the input of another D-type flip-flop 33.

Scrambler circuit 30 also has a SHIFT 3 input for shifting the bits through scrambler 30. The LOAD signal is used to load either a CS-ID (base site identification) if communication (voice) data is being processed or a "1111" hex series if control data is being processed.

The input to flip-flop 33 is clocked through by a signal from an AND gate 34 which has an EN (enable) and $\overline{TCLK}$ signals as inputs.

A timing diagram for encoder 10 is illustrated in FIG. 3. The first line of the timing diagram is a block of data 35 showing the required processing. In block 35, a first section 36 is CLEAR DATA meaning that no processing will be performed on that data. In section 37, the data will be utilized in CRC stage 13, but not be encrypted or scrambled. A third section 38 will be encrypted, used to calculate the CRC value, and scrambled. A CRC value will be inserted in section 39 and will be scrambled. Finally, another clear data section, 40, is provided at the end.

When processing a block of data, the EN signal 41 will be delayed 3 clock cycles to permit the first bit to arrive at the output of stage 14. Enable signal 41 will then go high permitting the output data from stage 14 to be passed through flip-flop 33.

As the clear bits from sections 36 and 37 are processed through stage 12, SELECT 1 signal 42 remains low since these bits are not encrypted. When the bits in section 38 begin processing, SELECT 1 signal 42 goes high, after a 1 cycle delay, to pass the signal output from encrypting circuit 22 through MUX 23.

Timing line 43 is comprised of two portions, 43a, which is SHIFT 2, and 43b, which is SELECT 2. During the processing of section 36, both 43a and 43b remain low. Once section 37 begins, after a 2 cycle delay, 43a goes high. This will enable CRC circuit 26 to use the data being input to calculate the CRC value. However, the data from CRC circuit 26 is not output through MUX 27 until all of the data has been processed. Therefore, 43b remains low, thereby selecting the output directly from flip-flop 25. Once all of the data to be used in generating the CRC value has been processed, 43b goes high to allow the CRC value to be output from CRC circuit 26 and inserted into section 39 of the signal. After the CRC value has been output, 43a and 43b again go low thereby stopping the CRC processing and allowing the output from flip-flop 26 to pass through MUX 27.

Timing signal 44 is the SELECT 3 signal for scrambler circuit 30. Until section 38 is reached, the data bits are permitted to pass from flip-flop 29 directly through MUX 31. Once section 38 begins, after a 3 cycle delay, the bits are scrambled and the output from scrambler circuit 30 is output through MUX 31. Following section 38, the scrambler is again cut-off and the data passes through directly from flip-flop 29.

Figure 5:
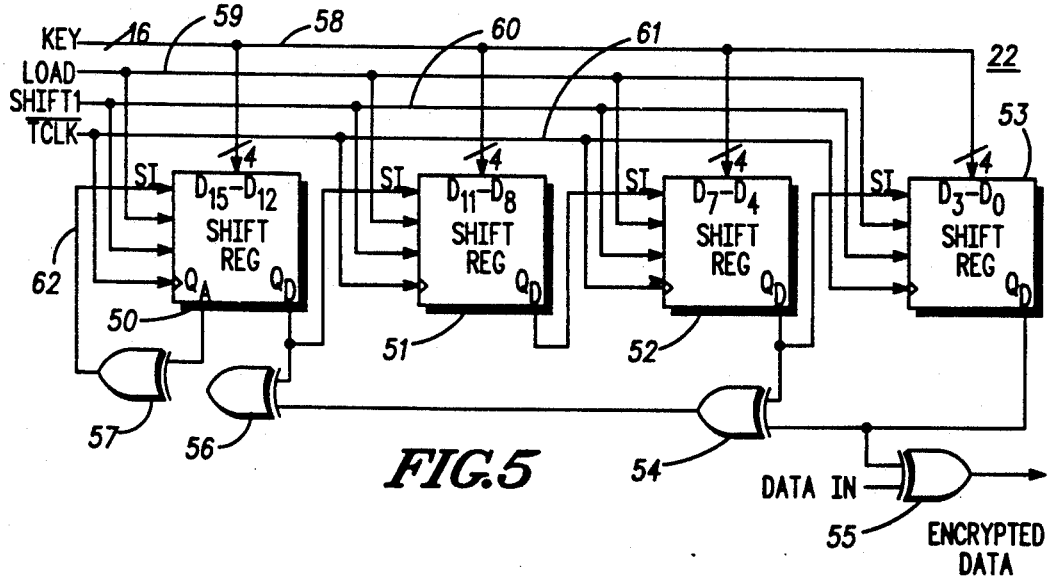
FIG. 5 is a block diagram of an encoder utilized in the present invention.

A more detailed description of the functioning of stages 12, 13, and 14 is provided in the description of FIGS. 4–9 below. In FIGS. 4 and 5, a processing diagram, generally designated 22', and a block diagram of encryption circuit 22 are illustrated, respectively. In operation, circuit 22 is initialized by loading an encryption key having 16 bits ($D_0$-$D_{15}$) into shift registers 50-53. In this particular embodiment, 4-Bit Parallel-Access Shift Registers are utilized. The key is provided along key bus 58 to the D inputs of registers 50-53. When a load enable signal is present along line 59, the data from bus 58 is loaded into the registers. To make encrypting circuit 22 operational, a shift enable signal is provided on SHIFT 1 line 60. Once the shift enable is present, the data in the shift registers will be shifted each time a clock signal $\overline{TCLK}$ is presented on line 61.

When a shift occurs, the $Q_D$ output from shift register 53 is exclusively ORed with a DATA IN signal in Exclusive-OR gate 55 to provide the encrypted output. The encrypted output is presented to one of the inputs of MUX 23, FIG. 1. The output from $Q_D$ of register 53 is also exclusively ORed with the $Q_D$ output of register 52 in Exclusive-OR 54. The output of gate 54 is the exclusively ORed with the $Q_D$ output from register 50 in Exclusive-OR 56. The output from gate 56 is then exclusively ORed with the $Q_A$ output of register 50 in Exclusive-OR 57 to provide the serial input along line 62 to register 50. In this configuration, the $Q_D$ output of a preceding register is provided to the serial input of the next register (e.g. the $Q_D$ output of register 51 is provided to the serial input of register 52).

In FIGS. 6 and 7, a processing diagram, generally designated 26', and a block diagram of CRC circuit 26 are illustrated, respectively. Circuit 26 consist of a set of five shift registers 68-72. In operation, circuit 26 is initialized by loading a series of logical 1's into registers 68 -72 along bus 65. This is accomplished when a load enable signal is received on line 66. Once initialized, circuit 26 is ready for use upon the receipt of a SHIFT 2 enable signal along line 67.

Once enabled, each time a $\overline{TCLK}$ signal is presented on line 73, the registers will shift. In this configuration, the $Q_D$ output of register 72 is exclusively ORed with a DATA IN signal in gate 75. The output from gate 75 is ANDed with an inverted SELECT 2 signal output from an inverter 79. The SELECT 2 input is set to 0 while the CRC value is being calculate and changed to 1 when the value is to be output to the system. The output from gate 76 is provided to the serial input port of register 68; and the $Q_D$ output of register 68 is provided to the serial input of register 69. The $Q_A$ output of register 69 is provided to the serial input of register 70 after being exclusively-ORed with the output from gate 76 in gate 77; and the $Q_D$ output from register 70 is provided to the serial input of register 71. The $Q_C$ output of register 71 is provided to the serial input of register 72 after being exclusively-ORed with the output from gate 76 in gate 78. This process is illustrated in the processing diagram of FIG. 6.

The remaining circuits, gates 80-82, along with inverter 79 comprise MUX 27. These are used to determine the output of CRC circuitry 26. If the original data is to be output, the inverted output from gate 79 goes high allowing the DATA IN signals to be processed through AND gate 80 and output through OR gate 82. If the CRC generated value is to be output, the SELECT 2 goes high, allowing the CRC value to be processed through AND gate 81 and output through OR gate 82.

Figure 8:
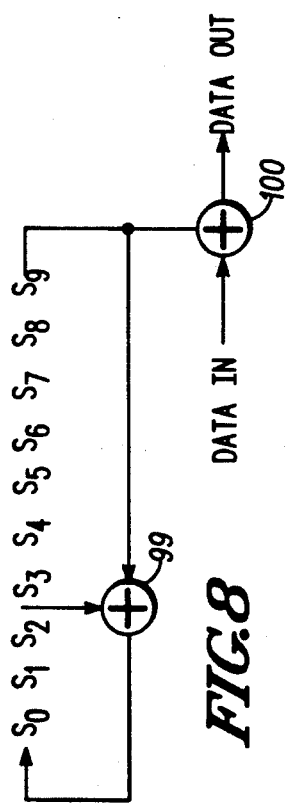
FIG. 8 is a processing diagram of a scrambler utilized in the present invention.
Figure 9:
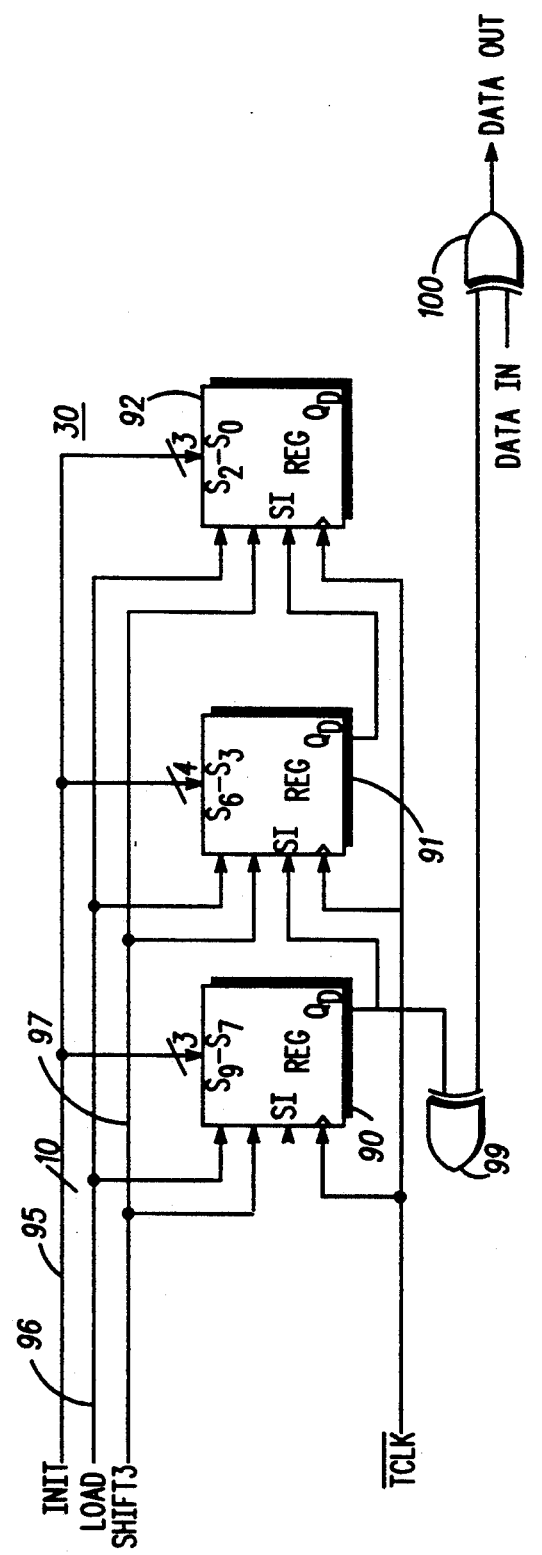
FIG. 9 is a block diagram of a scrambler utilized in the present invention.

Referring now to FIGS. 8 and 9, a processing diagram, generally designated 30', and a block diagram of scrambling circuit 30 are illustrated, respectively. In operation, circuit 30 consists of three shift registers 90-92. These registers are initialized using data provided over a COMM/CONTROL line 95. The initialization data will be dependent upon whether the data to be scrambled is communication data or control data. If the data is communication data, the initialization value loaded is the CS-ID, base station identification. If the data is control data, then 1's are loaded into $S_9$-$S_0$. The initialization value is loaded into registers 90-92 when the LOAD signal, line 96 directs.

After initialization, scrambler circuit 30 will begin operation when SHIFT 3, line 97 is active. The data will be shifted through registers 90-92 on clock pulses, $\overline{TCLK}$, provided on line 98. The output from the $Q_C$ output of register 92 is exclusively ORed with the $Q_C$ output of register 90 in gate 99. The output from gate 99 is then provided to the serial input of register 90. The $Q_C$ output of register 90 is also provided to the serial input of register 91; and the $Q_D$ output of register 91 is provided to the serial input of register 92.

The DATA OUTPUT of CRC circuit 30 is provided by exclusively ORing the $Q_C$ output of register 92 with the DATA IN input to circuit 30. This output is then passed to an input of MUX 31. This process is illustrated in processing diagram 30' of FIG. 8.

Therefore, an apparatus has been described which encodes a signal for transmission in a pipeline fashion. This apparatus provides a process to encode the bits from a single block of data in a parallel fashion. As a result, less time and storage space is required to encode the signal.

Thus, it will be apparent to one skilled in the art that there has been provided in accordance with the invention, an apparatus and method for encoding data for transmission by a communication system which fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method of encoding a communication signal having a plurality of bits, said method comprising the steps of:
    encrypting a first bit of a data block of said communication signal;
    cyclically redundancy checking said first bit while encrypting a second bit of said data block of said communication signal; and
    scrambling said first bit and cyclically redundancy checking said second bit while encrypting a third bit of said data block of said communication signal.

2. The method of claim 1 further comprising the steps of:
    scrambling a third to last bit of said data block of said communication signal and cyclically redundancy checking a next to last bit of said data block of said communication signal while encrypting a last bit of said data block of said communication signal;
    scrambling said next to last bit while cyclically redundancy checking said last bit; and
    scrambling said last bit.

3. An apparatus for encoding a communication signal comprising:
    encrypting means for encrypting said communication signal, said encrypting means comprising:
        a first register having a data input coupled to receive said communication signal and a clock input coupled to receive a clock signal;
        an encrypting device having an input coupled to an output of said first register;
        a first multiplexer having a first input coupled to said output of said first register, and a second input coupled to an output of said encrypting device;
    cyclic redundancy checking (CRC) means for calculating a cyclic redundancy value of said communication signal, said CRC means comprising;
        a second register having a data input coupled to receive an output from said encrypting means and a clock input coupled to receive said clock signal;
        an cyclic redundancy checker having an input coupled to an output of said second register;
        a second multiplexer having a first input coupled to said output of said second register, and a second input coupled to an output of said cyclic redundancy checker;
    scrambling means for scrambling said communication signal, said scrambler comprising;
        a third register having a data input coupled to receive an output from said cyclic redundancy checking means and a clock input coupled to receive said clock signal;
        an scrambler having an input coupled to an output of said third register;
        a third multiplexer having a first input coupled to said output of said third register, and a second input coupled to an output of said scrambler; and
    a fourth register having an input coupled to receive an output of said scrambling means and an output coupled to provide an encoded signal.

4. The apparatus of claim 3 wherein said encrypting device further comprises a key input for receiving a key code and a load input for directing said encrypting device to load said key code.

5. The apparatus of claim 3 wherein said cyclic redundancy checker further comprises a load input to reset said cyclic redundancy checker.

6. The apparatus of claim 3 wherein said scrambler further comprises an initialization input for receiving an initialization code and a load input for directing said scrambler to load said initialization code.

* * * * *